(12) United States Patent
Flournoy

(10) Patent No.: US 7,597,121 B2
(45) Date of Patent: *Oct. 6, 2009

(54) BRAKE FLUSH MACHINE WITH ORDERED CYLINDER EXTRACTION

(75) Inventor: Matthew Michael Flournoy, South Blend, IN (US)

(73) Assignee: Norco Industries, Inc., Compton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/034,423

(22) Filed: Feb. 20, 2008

(65) Prior Publication Data

US 2008/0135128 A1  Jun. 12, 2008

Related U.S. Application Data

(63) Continuation of application No. 11/345,729, filed on Feb. 2, 2006, now Pat. No. 7,357,161.

(51) Int. Cl.
*B65B 1/04* (2006.01)
*B60T 11/00* (2006.01)

(52) U.S. Cl. ............... 141/98; 141/65; 141/67; 141/99; 141/302; 188/352

(58) Field of Classification Search ........... 141/2, 141/7, 59, 65, 67, 98, 99, 231, 301, 302; 184/1.5; 188/352
See application file for complete search history.

(56) References Cited

U.S. PATENT DOCUMENTS

| 6,796,339 | B1 | 9/2004 | Petty | |
|---|---|---|---|---|
| 6,889,724 | B2 * | 5/2005 | Awad | 141/65 |
| 6,929,036 | B2 * | 8/2005 | Awad | 141/65 |
| 7,096,894 | B1 * | 8/2006 | Hollub et al. | 141/65 |
| 7,281,551 | B2 * | 10/2007 | Mengelt | 141/98 |
| 7,357,161 | B2 * | 4/2008 | Flournoy | 141/99 |

* cited by examiner

*Primary Examiner*—Timothy L Maust
(74) *Attorney, Agent, or Firm*—Fulwider Patton LLP

(57) ABSTRACT

A brake fluid flush machine comprises a used fluid tank, a new fluid tank, a manifold connectable to four secondary brake cylinders, a suction pump connecting the manifold to said used fluid tank for draining used brake fluid from said four secondary brake cylinders, a pressure pump connecting the new fluid tank to the master cylinder, and a processor. The processor is configured to control the fluid exchange by sequentially opening and closing valves that couple the four secondary brake cylinders with the suction pump, where the valves may be opened according to a user specified sequence.

8 Claims, 4 Drawing Sheets

BRAKE FLUSH MACHINE WITH ORDERED CYLINDER EXTRACTION

CROSS REFERENCE TO RELATED APPLICATIONS

This application is a continuation of U.S. patent application Ser. No. 11/345,729, filed Feb. 2, 2006 now U.S. Pat. No. 7,357,161, and claims priority to same and is hereby incorporated by reference in its entirety.

FIELD OF THE INVENTION

The present invention is directed to the field of automotive service machines, and more particularly to a machine for flushing and replenishing brake fluid in a braking system.

BACKGROUND OF THE INVENTION

Hydraulic braking systems are prevalent among many current vehicles including passenger vehicles. Such braking systems have a master cylinder that holds a brake fluid, and auxiliary cylinders connected the master cylinder to each wheel's dedicated cylinder via a brake line. When the brake pedal of an automobile is actuated, a piston in the master cylinder translates to displace hydraulic brake fluid in the primary cylinder, which in turn forces brake fluid through the brake lines to the auxiliary cylinders at each wheel. The brake fluid in the brake lines is pressurized and imparts a hydraulic force actuating the auxiliary cylinders, which in turn forces a brake pad against the brake drum or rotor of the automobile's wheel. The frictional force of the brake pad against the drum or rotor resists rotation of the wheels themselves, thereby decelerating or stopping the vehicle. Circulating brake fluid can additionally lubricate pistons, cylinders, seals and valves within the brake system.

In order to operate in a variety of conditions, brake fluid is preferably characterized by a high boiling temperature and a low freezing temperature. Moisture in the brake line can form ice at low temperatures that can lead to a loss of fluid flow. Unwanted water absorbed into the brake fluid leads to a reduced boiling temperature and the formation of ice, which causes poorer brake performance. Contamination is also an issue for effective operation of the braking system, where breakdown of the fluid can lead to premature wear of piston seals, hoses and other parts. Additionally, oxidation of the brake fluid upon exposure to air can result in a reduced boiling temperature. Additionally the additive packages used in brake fluids to reduce oxidation, foaming and corrosion are denigrated by the presence of moisture.

Because the introduction of unwanted moisture and contaminants in the braking system is unavoidable, automobile manufactures recommend that automotive brake fluid should be replaced and the brake system flushed of contaminants when the moisture level in the brake fluid exceeds a predetermined threshold, when contamination is present, or when the hydraulic fluid's inhibitor package has deteriorated.

Brake fluids for passenger vehicles are usually clear, volatile, water-soluble liquids comprised of a mixture of several alcohols such as glycols, although Silicone-based brake fluids are also known. Through use, brake fluid can become discolored due to contamination from dirt and disintegrating rubber seals. Furthermore, as the brake fluid absorbs moisture from the air, its boiling point is lowered and corrosion may initiate inside the brake system. A reduced boiling point can result in the brake fluid boiling under extreme conditions such as a long downhill stretch of intermittent braking. Bubbles in the brake fluid due to boiling reduce the brake effectiveness because gas is very compressible as compared with fluid, and thus the force applied by the pressurized brake fluid in the brake lines is lessened as the amount of gas in the system increases.

Particulate matter such as airborne dust and rubber seal fragments can also collect within the fluid filled brake lines preventing proper sealing of valves within the braking system. To remove water and contaminants the brake fluid is periodically removed and replaced with new brake fluid, thereby restoring the brake fluid's preferred temperature range, corrosion resistance and braking efficiency. However, care must be taken to prevent exposure to air by the fresh brake fluid. Brake fluid exposed to ambient air can absorb moisture resulting in an immediate loss of the brake fluid's effectiveness. Typically, the entire hydraulic fluid is drained from the brake system and replaced with new fluid, the whole operation being carried out in an open-air environment whereby the fluid is exposed to the atmosphere as the brake system is being drained and new fluid is added. Unfortunately this known method can release pollutants into the air and exposes the operator to potentially harmful fluids and vapors.

Prior art brake fluid exchange machines typically required two workers to complete the job. A first worker would start the engine and pump the brake pedal while the second worker monitored the fluid exchange machine as it vacuumed the old fluid and then pumped in the new fluid. The job typically took up to thirty minutes and was not cost effective in that two workers must be present for essentially the entire job. Moreover, the brake fluid exchange process did not account for the varying lengths of brake line, adding inefficiencies and undue delays in the fluid exchange process. Thus, there is a need in the industry for an automated brake fluid replacement system that connects to the braking system of a vehicle and allows a single worker to complete the task in less time than previous systems.

SUMMARY OF THE INVENTION

The present invention is an automatic brake fluid exchange machine that connects to a hydraulic braking system for simultaneous fluid exchange of the braking system. Old, used brake fluid is vacuumed out of the system simultaneously while fresh, new brake fluid is supplied to the system. A vacuum pump is connected to each bleed screw of the designated wheel braking elements and the anti-lock braking system element to vacuum out old brake fluid while a pressure pump delivers new brake fluid to the master cylinder of the hydraulic system. A processor controls the pump and also controls the operation of five solenoid valves connecting the vacuum pump via five separate fluid lines to the four wheel brake elements and the anti-lock brake cylinder. The five separate fluid lines each attach to the bleeder screw of the four wheel brake elements and the ABS hook-up through a five valve manifold that individually opens and closes each valve using, for example, a solenoid.

The processor manipulates the vacuum pump and manifold valves in order to extract old fluid from the brake system in a predetermined order, beginning with the longest path between the master cylinder and the respective brake element (rear passenger wheel), and ending with the shortest path (front driver wheel), followed by the ABS element. In addition to the predetermined order of the old fluid extraction, the processor controls the timing of the fluid extraction based on the distance to the master cylinder, such that the rear wheel brake elements have a longer fluid extraction period due to the greater quantity of total fluid in the line, as compared with the short line between the master cylinder and the front driver wheel. Each line has a successively shorter flush period coinciding with shorter fluid lines containing less fluid to flush. This feature saves time and new fluid, because the each line is subjected only to the necessary flushing period to extract the old fluid without delaying or flushing new fluid entering the system.

These and other features and advantages of the invention will become apparent from the following detailed description, taken in conjunction with the accompanying drawings which illustrate, by way of example, the features of the invention

DETAILED DESCRIPTION OF THE INVENTION

Figure 1:
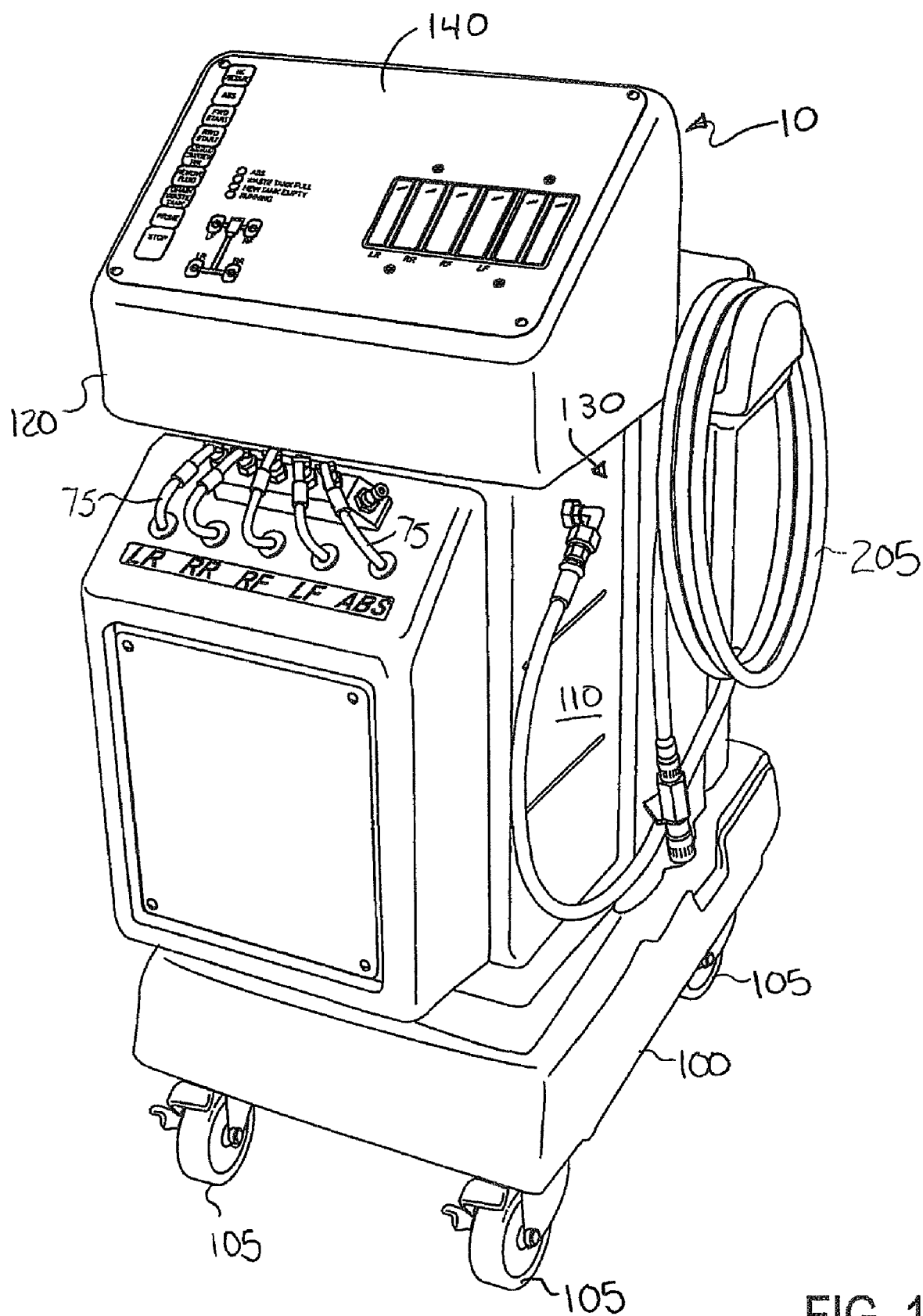
FIG. 1 is an elevated perspective view of a first preferred embodiment of the present invention.

FIG. 1 illustrates an automatic brake flush machine according to the teachings of the present invention. The brake machine is a combination of plumbing components (pumps, tubing, valves) and electrical components (processors, electrical cables, display equipment) enclosed in a durable plastic housing. The housing 10 includes a platform 100 with four caster wheels 105 that allow the machine to be rolled quickly into position as needed to service the vehicle. On the platform 100 is a cabinet 110 that encloses a twenty quart waste fluid tank 70, a seven quart new fluid tank 20, an electrical system powered by a twelve volt battery such as those found in most passenger vehicles, a vacuum pump 55, a pressure pump 30, and a five valve solenoid 95 for controlling the extraction of waste fluid from the cylinders of the respective wheels and the ABS system 60.

Figure 2:
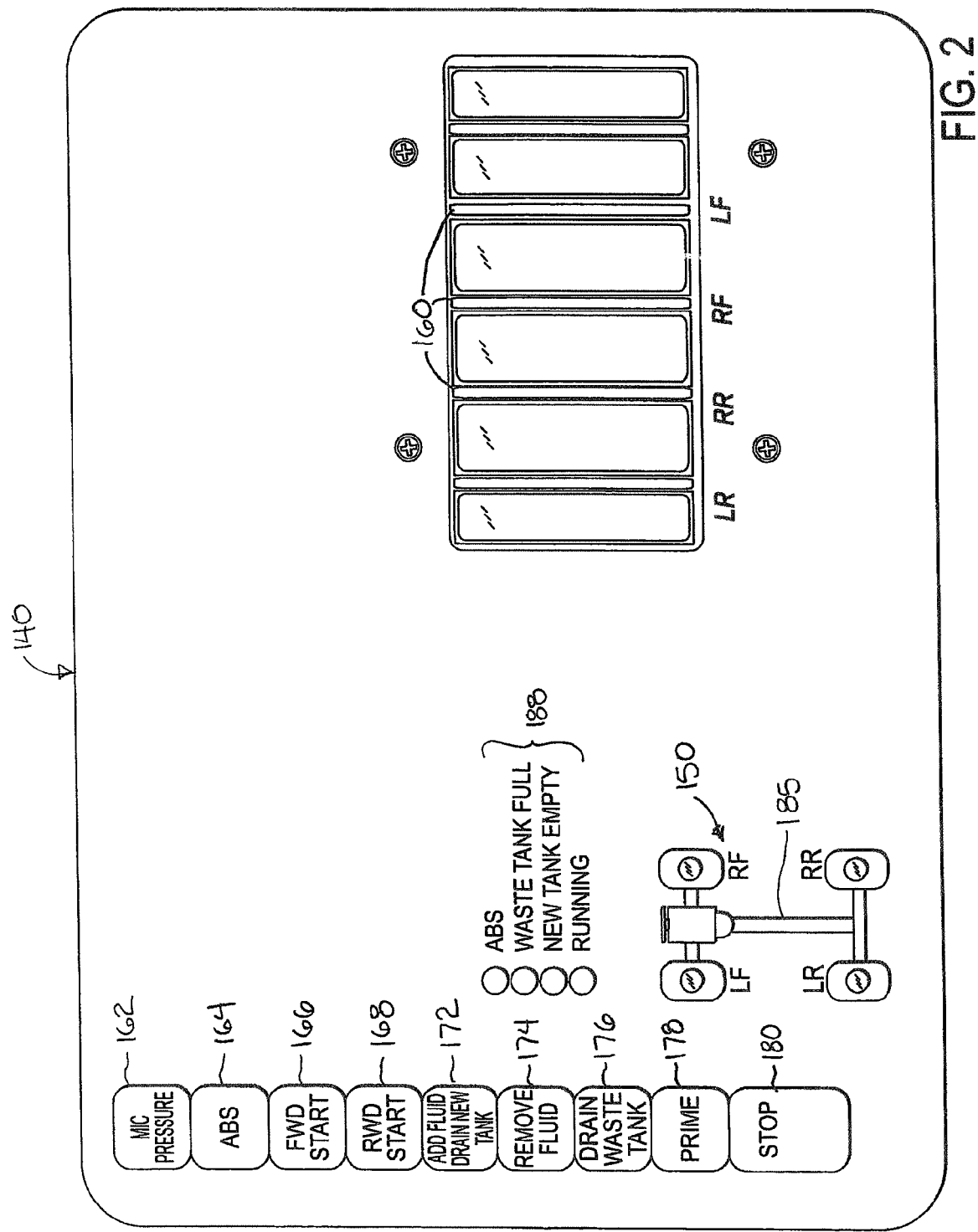
FIG. 2 is an enlarged front view of the control panel of the embodiment of FIG. 1.

The cabinet 110 includes a podium 120 having a column 130 and control area 140. The controls for operating the machine and the sight glasses to evaluate the progress of the fluid exchange process are located on the control area 140. FIG. 2 illustrates the face plate on the control area 140, comprising an illuminated status diagram 150 to track the progress of the fluid exchange operation, five separate sight glasses 160 to visually check the transformation of the used fluid to fresh fluid, and buttons for operating the machine manually rather than automatically. Said buttons include a master cylinder pressure button 162 for detecting leaks around the master cylinder cap, an anti-lock brake cylinder button 164 for removing brake fluid from the ABS reservoir, a forward axel start button 166 for initiating withdrawal of the used fluid from the front brake axel cylinders, and rearward axel start button 168 for initiating withdrawal of the used fluid from the rear brake cylinders. An "add fluid/drain new tank" button 172 activates the pressure pump to force new fluid from the new fluid tank, which could be used to top off the system or to evacuate the new fluid tank. A "remove fluid" button 174 actuates the vacuum pump to withdraw fluid through any of the attached fluid lines. A "drain waste tank" button 176 can be used to evacuate the used fluid tank in the machine, and a "prime" button 178 is used to prime the pumps for operation. Finally, an oversized "stop" button 180 terminates the operation of the machine.

A schematic 185 of the vehicle brake system is present on the control area 140 overlaying LED lights that show the cylinder being drained during the fluid exchange operation. That is, the rear passenger cylinder LED illuminates as that cylinder is evacuated, and then the rear driver cylinder LED illuminates and so on. Information/Warning LED lights 188 also are found on the control area 140, including an indicator for the ABS fluid exchange, a warning light when the waste tank is full, a warning when the new fluid tank is empty, and an indicator light showing the machine is operation. In addition, a separate sight glass 160 is provided for each fluid line connecting the vacuum pump to the rear passenger wheel, the rear driver wheel, the front passenger wheel, the front driver wheel, and the ABS system. As the fluid exchange process proceeds, the fluid is pumped through the sight glass for visual inspection. The fluid in the sight glass will initially reflect the dark, murky color reflecting the oxidized used fluid and then gradually change to a reddish clearer color indicative of new, unoxidized brake fluid. Beneath the control area 140 is a circuit board coupled to a processor for controlling the operation of the machine, including pressure sensitive switches beneath the buttons on the control area that translate the user's physical depressing of the buttons into commands for the processor.

Figure 3:
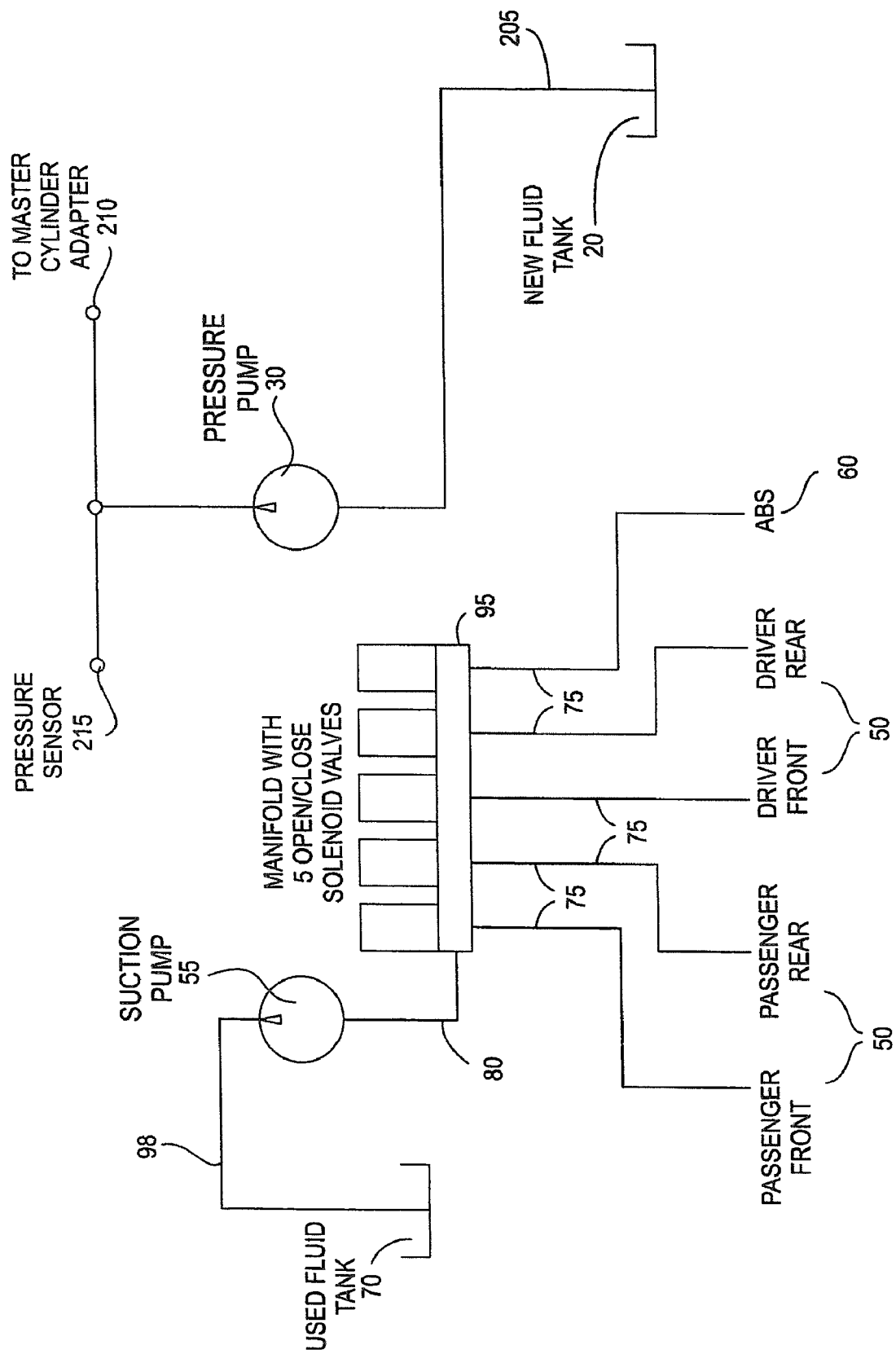
FIG. 3 is a schematic of the plumbing system and processor of the embodiment of FIG. 1.

The housing also includes five lines 75 of approximately fifteen feet that allow the machine to connect with the four bleeder valves of the respective wheel cylinders and the ABS system if present. FIG. 3 is a schematic of the fluid line connections of the present system. A new fluid tank 20 within the housing 10 is connected by a fluid conduit 205 to the pressure pump 30, which forces fresh brake fluid from the new fluid tank 20 to the master cylinder 210 of the vehicle to be serviced. A pressure sensor 215 measures the fluid pressure in the master cylinder 210 and communicates the pressure to the processor of the brake machine. On the other side of the system, the four cylinders 50 of the vehicle brake system and the ABS reservoir 60 are connected to the vacuum pump 85 through fluid conduits 75 and 80. The fluid conduits 75 each terminate at a five way multi-valve manifold 95 which opens and closes using a solenoid. Each fluid path through the multi-valve solenoid 95 leads to a respective cylinder of the brake system or the ABS reservoir if present. The processor of the brake machine controls the opening and closing of the manifold by actuating the solenoid, which thereby controls the sequence of the fluid withdrawal from the brake system. The manifold 95 is connected to the vacuum pump 55 via fluid conduit 80, and the vacuum pump 55 evacuates the used fluid to the used fluid tank 70 in the brake machine via fluid conduit 98.

The sequence of the brake fluid exchange using the present invention will now be described. First, the new fluid tank 20 is filled with fresh brake fluid and the used fluid tank 70 is drained of any left over used fluid from a previous operation. Suction hose 75 connecting the ABS reservoir to the manifold 95 is removed and connected to the master cylinder 210, and after depressing the "remove fluid" button 174 on the control area 140 the used fluid in the master cylinder is substantially removed (although it is important not to remove all of the fluid to ensure air bubbles are not introduced into the system). The "stop" button 180 is used to terminate the draining process. The fluid conduit 205 is then connected to the master cylinder 210 using an appropriate adapter.

The master cylinder pressure button 162 is depressed to verify that no leaks are present around the master cylinder cap, where the brake system is thusly pressurized to allow the bleeder screws on the respective cylinders to be opened safely without introducing air through the bleeder screw. With the master cylinder connected to the machine, the vehicle is then raised on a hydraulic stand and the fluid conduits 75 are connected to each bleeder fittings for the brake cylinders. The bleeder screws are opened approximately one quarter turn until fluid flows into the respective fluid lines 75. The user than returns to the machine and depresses the "forward start" or "rearward start" button depending on the selected mode, whereupon the machine will automatically cycle through the four brake cylinders without further intervention by the user. At each stage, the LED on the control panel will illuminate corresponding to the respective cylinder being evacuated. Simultaneously, new fluid is pumped to the master cylinder to maintain equilibrium in the system. A worker can leave the fluid exchange machine to pump the brakes as required to expel fluid trapped in the cylinders and promote a more complete fluid exchange, while the machine automatically goes through the ordered sequence of cylinder fluid removal. Once the fluid exchange is complete, the bleeder screws are closed and the hoses are disconnected, whereupon the vehicle is lowered from the stand. The master cylinder adapter is removed and the fluid conduit 205 is removed from the master cylinder. Adjustments to the fluid level, either removing or adding fluid, can be completed using the appropriate buttons. The vehicle is then started and the brake pedal is checked to verify brake pressure.

Figure 4:
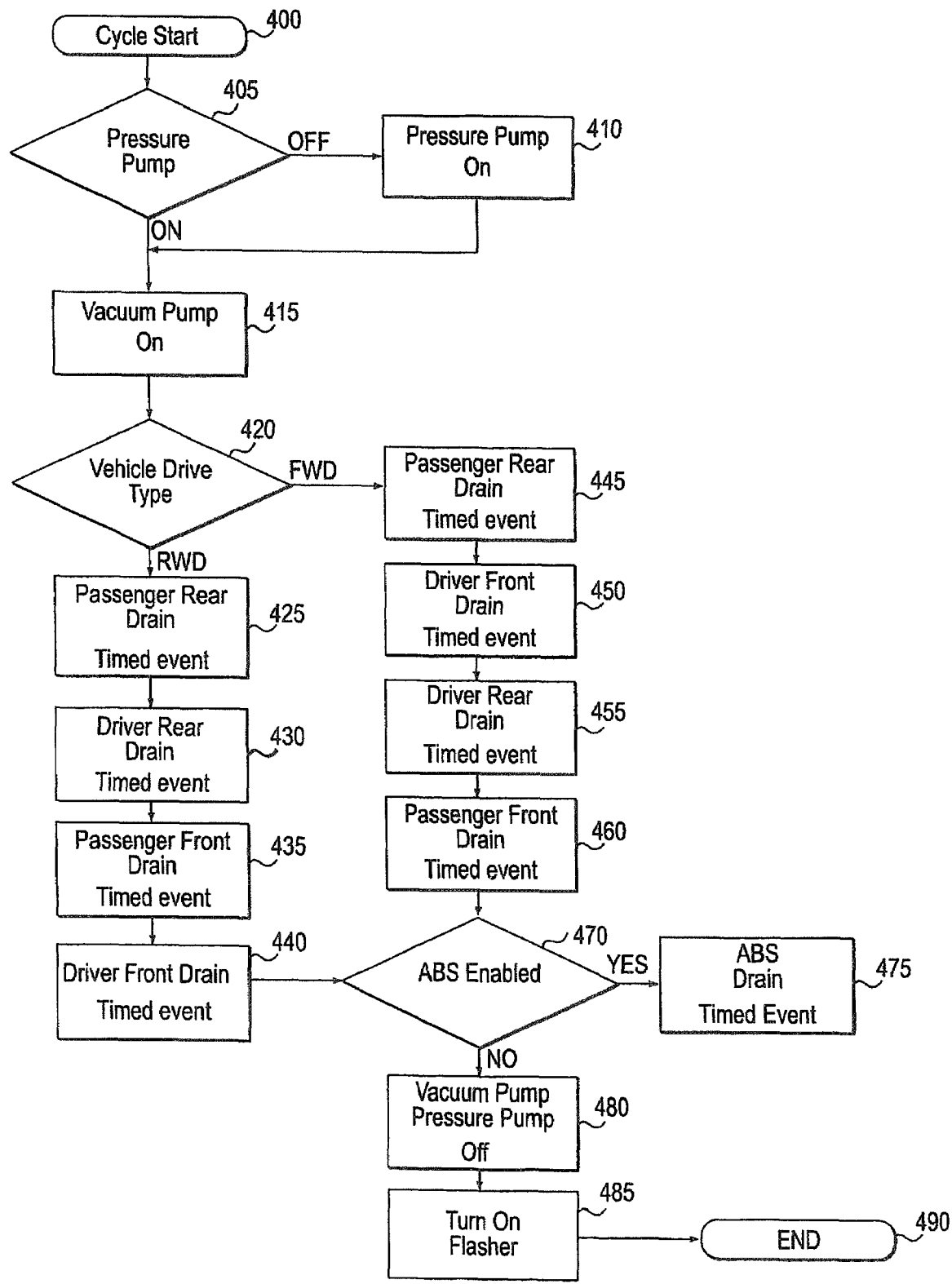
FIG. 4 is a flow chart of the operation of the embodiment of FIG. 1.

Turning to FIG. 4, the flowchart for the processor's logic is illustrated. The cycle start step 400 is followed by the activation of the pressure pump 30 at steps 405 and step 410, and the activation of the vacuum pump 55 at step 415. At this point, the user selects either the forward axel start button or the rearward axel start button at step 420 leading to two branches depending upon the selection. If the rearward axel start button is depressed, the passenger rear brake cylinder is evacuated in step 425, followed by the evacuation of the driver rear brake cylinder in step 430. The front passenger brake cylinder is evacuated in step 435 and the driver front brake cylinder is drained in step 440. Alternately, if the forward axel start button is depressed then the passenger rear brake cylinder is drained in step 445 followed by the driver front brake cylinder in step 450, followed in step 455 by the driver rear cylinder and concluding with the passenger front brake cylinder in step 460.

A decision is then determined in step 470 whether the ABS system is enabled, and the ABS is drained in 475 if the determination is in the affirmative. The pumps are deactivated in step 480 and the flashing indicator light on the control panel is activated in step 485, before the program concludes in step 490.

The brake machine of the present invention works on a time function for adding and removing brake fluid simultaneously from the braking system. On the pressure side, the pump 30 supplies new fluid to the brake master cylinder reservoir, where a pressure switch 215 regulates the operation of the pump 30 and ensures that there are no leaks in the system. At the same time, the suction side of the operation incorporates five separate fluid lines designated PF, PR, DF, DR, and ABS. These service lines are each attached to their respective bleeder screws at the four corners of the vehicle's brake system, along with the ABS reservoir. Each of the five lines are connected to a manifold utilizing five open/close solenoid valves controlled by the processor to manipulate the flow of brake fluid from the five service points of the vehicle to a used fluid tank in the housing of the machine. The timing and sequence of the fluid removal is based on two factors. First, the selection of the appropriate modes from among four separate service modes include ABS, non-ABS, front wheel drive, and rear wheel drive.

The first factor is the selection of one of these modes by the user. The machine will flush the brake cylinders according to the logic described above depending on the selection of the appropriate mode. As for the timing of the fluid removal, each successive brake cylinder will experience a slightly shorter drain period because the distance between the next cylinder and the master cylinder is shorter than the previous wheel. The third and fourth wheels are then completed with shorter drain periods, and then the ABS reservoir is drained last if necessary with the duration of the ABS the shortest of all. The respective time intervals for each drain operation can be run individually or grouped into a total time interval for the complete operation, where the processor will allocate the different time periods based on the total allotted fluid exchange operation.

That is, the processor will determine based on the total fluid exchange operation how long each individual brake cylinder drain period is allotted to complete the entire operation in the designated time. As an example, for a nine minute fluid exchange operation without ABS the sequence may occur as follows: 190 seconds for the rear passenger brake cylinder, followed by 170 seconds for the rear driver brake cylinder, followed by 95 seconds for the front passenger brake cylinder and finally 85 seconds for the front driver brake cylinder. Here, the sequence is carried out in a predetermined order and the timing of each drain operation is determined by the distance along a fluid conduit between the respective wheel and the master cylinder.

The above described embodiments and methods are exemplary and not exclusive, in order to better understand the meanings of the claims below. Interpretation of the claims should not be limited in any manner by the above described embodiments, but rather the scope and meaning of the claims is intended to be governed solely by the ordinary meaning of the terms as understood by one of ordinary skill in the art, in view of the teachings herein.

I claim:

1. An automatic brake fluid exchange machine for use with a braking system having four discrete brake cylinders and a master cylinder, comprising:

a used fluid tank;

a new fluid tank;

a manifold connectable to four secondary brake cylinders corresponding to a front driver's side wheel, a front passenger's side wheel, a rear driver's side wheel, and a rear passenger's side wheel;

a suction pump connecting the manifold to said used fluid tank for draining used brake fluid from said four secondary brake cylinders;

a pressure pump connecting the new fluid tank to the master cylinder;

a processor for opening and closing the valves that couple the four secondary brake cylinders with the suction pump, where the processor first opens and then closes each valve according to a predetermined sequence, said processor further controls said pressure pump to deliver new fluid from said new fluid tank into said master cylinder simultaneously as said suction pump sequentially withdraws used fluid from said four secondary brake cylinders; and user selection means coupled to said processor for enabling a user to select a predetermined sequence of opening and closing said valves by said processor.

2. The automatic brake fluid exchange machine of claim 1 wherein the user selection means includes an actuator for initiating the predetermined sequence to begin fluid exchange with a front axel before conducting fluid exchange of the rear axel according to the user's selection.

3. The automatic brake fluid exchange machine of claim 1 wherein the user selection means includes an actuator for initiating the predetermined sequence to begin fluid exchange with a rear axel before conducting fluid exchange of the front axel according to the user's selection.

4. The automatic brake fluid exchange machine of claim 1 wherein said processor is programmed to first open and then close each valve coupling the four secondary brake cylinders for a period that is dependent upon a distance between an associated wheel of said secondary brake cylinder and the master cylinder.

5. The automatic brake fluid exchange machine of claim 4 wherein said processor is programmed to first open and then close each valve coupling the four secondary brake cylinders to correspond with a user selected time period for a complete fluid exchange operation.

6. The automatic brake fluid exchange machine of claim 1 wherein said manifold is further connectable to said anti-lock braking system cylinder, and said processor sequentially opens and closes a valve connecting the suction pump to the anti-lock braking cylinder and opens and closes each valve coupling the four secondary brake cylinders to the suction pump according to a predetermined sequence.

7. The automatic brake fluid exchange machine of claim 6 wherein said processor is programmed to first open and then close each valve coupling the four secondary brake cylinders and the valve connecting the suction pump to the anti-lock braking cylinder for a period that is dependent upon a distance between an associated wheel of said secondary brake cylinder and the master cylinder and a distance between the anti-locking braking cylinder and the master cylinder.

8. An automatic brake fluid exchange machine for use with a braking system having four discrete brake cylinders and a master cylinder, comprising:

a used fluid tank;

a new fluid tank;

a manifold connectable to four secondary brake cylinders corresponding to a front driver's side wheel, a front passenger's side wheel, a rear driver's side wheel, and a rear passenger's side wheel;

a suction pump connecting the manifold to said used fluid tank for draining used brake fluid from said four secondary brake cylinders;

a pressure pump connecting the new fluid tank to the master cylinder; and a processor for opening and closing the valves that couple the four secondary brake cylinders with the suction pump, where the processor first opens and then closes each valve according to a predetermined sequence, said processor programmed to first open and then close each valve for a period that is dependent upon a distance between an associated wheel of said secondary brake cylinder and the master cylinder and a distance between the anti-locking braking cylinder and the master cylinder.

* * * * *